United States Patent
Kuin et al.

(10) Patent No.: US 6,887,118 B2
(45) Date of Patent: *May 3, 2005

(54) METHOD FOR MANUFACTURING A GLASS PANEL FOR A CATHODE RAY TUBE

(75) Inventors: Georgius Petrus Jozef Kuin, Eindhoven (NL); Hermanus Nicolaas Tuin, Best (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 322 days.

This patent is subject to a terminal disclaimer.

(21) Appl. No.: 10/124,012

(22) Filed: Apr. 17, 2002

(65) Prior Publication Data

US 2003/0030362 A1 Feb. 13, 2003

(30) Foreign Application Priority Data

Apr. 19, 2001 (EP) .............................. 01201419

(51) Int. Cl.⁷ .............................. H01J 9/00; C03B 11/12
(52) U.S. Cl. ................... 445/22; 445/24; 65/69
(58) Field of Search ................... 445/22–24; 220/2.1 A, 220/2.1 R; 313/477 R, 461; 65/68–69, 85, 103

(56) References Cited

U.S. PATENT DOCUMENTS

| | | | | |
|---|---|---|---|---|
| 4,000,997 A | * | 1/1977 | Rogers .......................... 65/23 |
| 4,871,385 A | * | 10/1989 | Lecourt et al. ................. 65/115 |
| 5,145,437 A | * | 9/1992 | Ondra et al. ................... 445/45 |
| 5,536,995 A | | 7/1996 | Sugawara et al. .......... 313/477 |
| 5,547,409 A | | 8/1996 | Nakamura et al. .............. 445/8 |
| 5,837,026 A | | 11/1998 | Sugawara et al. .............. 65/66 |
| RE36,838 E | * | 8/2000 | Sugawara et al. ...... 313/477 R |

FOREIGN PATENT DOCUMENTS

EP          1241700 A1          9/2002          ............ H01J/29/86

* cited by examiner

Primary Examiner—Nimeshkumar D. Patel
Assistant Examiner—German Colón

(57) ABSTRACT

A method for manufacturing a display tube includes press-forming molten glass in a mold, cooling the formed glass after it has been taken out from the mold, and reducing the temperature gradient between center and edge of the panel by reflecting heat radiation back to a central portion of the panel.

9 Claims, 3 Drawing Sheets

METHOD FOR MANUFACTURING A GLASS PANEL FOR A CATHODE RAY TUBE

The invention relates to a method for manufacturing a glass panel for a display tube comprising a first stage of press-forming molten glass put in a mold and a second stage of cooling the formed glass after it has been taken out from the mold.

In the known methods a glass panel is press-formed which usually takes place at very high temperatures (1000° C.–1100° C.). In this manner a glass face panel can be formed. Cathode ray tubes, for example, comprise such a glass panel.

Cathode ray tubes (CRT's) are becoming of ever more greater size, thus increasing the weight of the CRT'S. Furthermore the front surface of the glass panel is becoming ever more flatter. However, increasing the flatness of the front surface of the face panel generally increases also the weight of the glass panel because the thickness of the glass panel has to be increased to ensure safety against implosion or explosion of the CRT.

There exists a great need for increase in strength of the CRT, and in particular of the glass panel, without increasing the weight. An increase in the strength of the glass panel may improve the yield.

The present invention is aimed at providing a method which enables increasing the yield of the method and/or reducing the weight of the glass panel.

To this end the method in accordance with the invention is characterized in that during at least a part of the second stage the heat radiation of at least one of the inner and outer face portions of the central panel portion is reduced to reduce a temperature gradient to the edge portions of the panel.

The invention is based on the insight that during the cooling stage inhomogeneities in the stress level in the panel can occur. In order to improve the strength of (Real Flat) display panels the cooling velocity after press forming is usually increased to a such extent that a compressive stress is produced in the surface in the order of 3 to 25 Mpa. Panels of this type are called High Surface Compression panels. Trying to correct for the above inhomogeneities in the stress level during a final annealing step would easily affect the necessary compressive stress (bulk stress). This reduces the yield and can seriously affect the safety of the tubes. This is in particular important for panels with an (almost) flat inner and/or outer surface such as Real Flat panels.

Because real flat panels (for instance 51RF) have a wedge, normally the North position of the panels has a tensile stress (geometrical stress) at North position when the panel is cooled down. The intention of the inventive cooling process is to minimize temperature differences between center and edge of the front of the panel. By this the tensile stress at the North position will decrease, so cracks starting at the North position will more likely propagate to the corners instead of to the center; this is better for safety. The local reduction in cooling can be advantageously realized by placing a heat reflection means opposite to the central portion of the panel. What has been explained with respect to the North position (the central area of the long upper side of the panel) also holds, mutatis mutandis, with respect to the East, South, West-and corner-positions.

Reducing the heat radiation of the thinner, central portion, of the panel has been found to be an effective means to reduce temperature gradients over the panel surface. Radiation transport is responsible for 40–70% of the heat transport. Cooling with air of other portions alone is less efficient. This effect may for instance be used in practice to manufacture panels with a lower weight, or panels with a flatter front surface, or to reduce the fall-out (=percentage of panels that does not pass safety tests) or any combination of these beneficial effects.

According to a first embodiment a heat reflection means is arranged at a position facing at least one of the inner and outer face portions of the central panel portion, leaving the edge portions free. Preferably the heat reflection means faces each of the inner and outer face portions for a stronger effect.

According to a further embodiment a heat reflection means is used which comprises at least one plate made of a material selected from the group comprising Ni, Al, Au, Al-oxide, or covered with a such material.

To increase the effect of the heat reflection means a heat absorption means may be arranged adjacent at least one of the edge portions of the glass panel. (The edge portions are the areas where the viewing window and the peripheral side walls of the glass panel join.)

In view of the above it is in particular an aspect of the invention to provide a display panel of the High Surface Compression type which presents substantially no tensile stresses in the central area of at least one of the long and short side portions of the panel.

A manner to realize this is to take measures that during the cooling stage all panel positions pass $T_g$ substantially at the same moment. ($T_g$ is the transition temperature at which the glass changes from the viscous state to the solid state)

In the framework of the invention the cooling stage can be advantageously be carried out in one of the following two manners:

a. a method which is characterized in that the glass has a softening point $T_g$, the annealing lehr is kept at a temperature $T_L$ below $T_g$ and the panel with a temperature $T_S$ above $T_g$ is placed in the annealing lehr.

b. a method which is characterized in that the glass has a softening point $T_g$, the annealing lehr is set at a temperature $T_L$ above $T_g$, and the panel is placed in the annealing lehr, whereby the lehr cools down to a temperature below $T_g$.

These and other aspects of the invention will be apparent from and elucidated with reference to the embodiments described hereinafter.

In the drawings.

The Figures are purely schematic and not drawn to scale. In particular for clarity, some dimensions are exaggerated strongly. In the Figures, like reference numerals refer to like parts, whenever possible.

Figure 1:
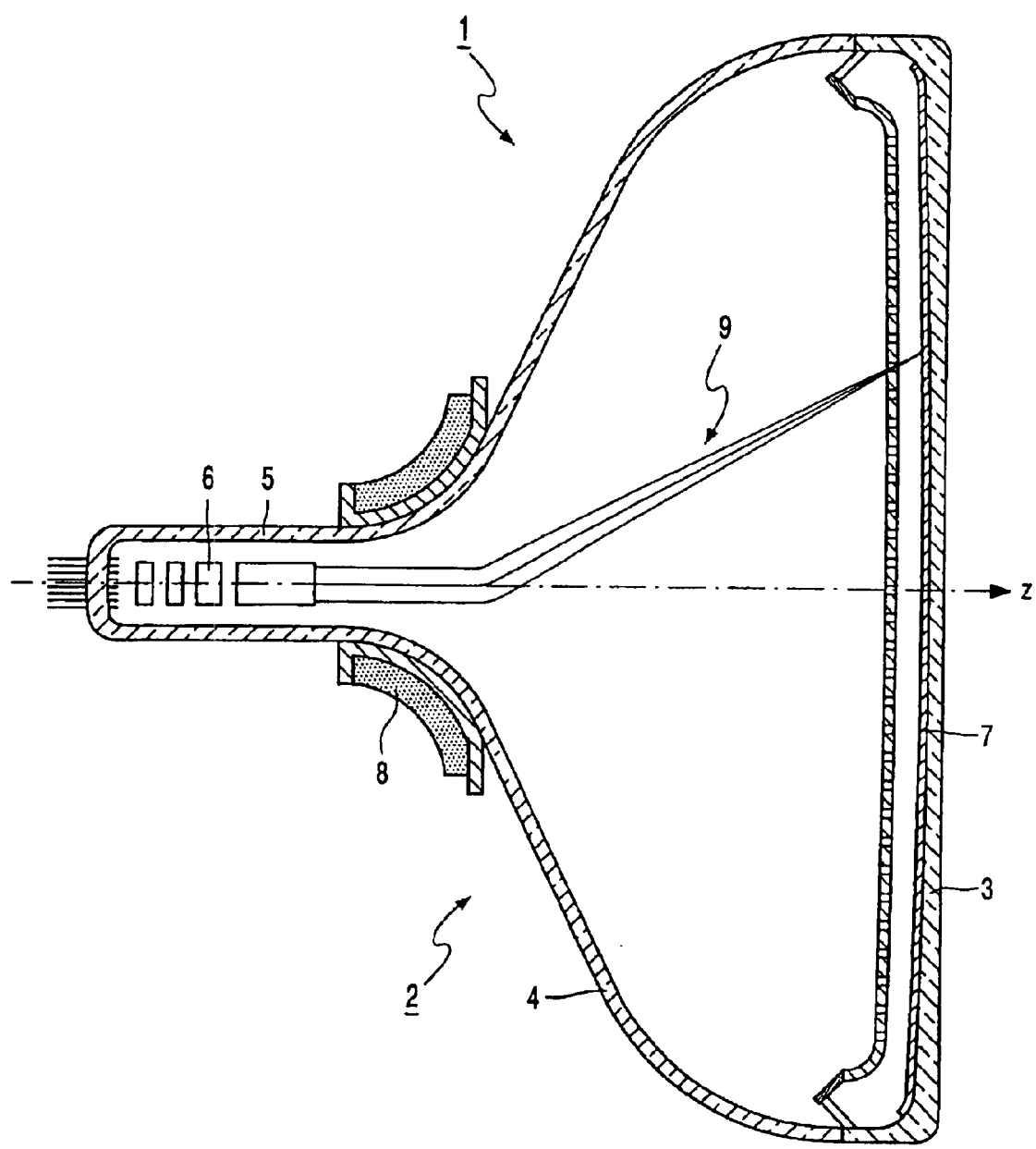
FIG. 1 is a schematic view of a cross-section of a display tube, having a press-formed glass panel.

FIG. 1 is a schematic view of a cross-section of a display tube 1 having a glass envelope 2 which includes a display panel 3, a cone 4 and a neck 5. In the neck 5, there is an electron gun 6 for generating one or more electron beams 9. The electron beam is focused on a phosphor layer 7 on the inner surface of the display panel 3 and deflected across the display panel 3 in two mutually perpendicular directions by means of a deflection coil system 8.

Display devices often comprise cathode ray tubes or television display tubes 1 which are entirely made of glass and are built up of two or more portions with glass walls of different thicknesses or different heat-absorption characteristics. For example, a glass television display tube 1 customarily comprises a glass display panel 3 and a glass cone 4 which are separately produced and subsequently united by fusing or using a (solder) glass fit, the joint formed being hermetically tight. The display panel 3 of such tubes is formed by a glass wall whose thickness is much greater than the wall thickness of the cone parts of such tubes. Such a greater wall thickness of the display panel 3 serves to ensure that it is sufficiently rigid when the eventual tubes comprising such a panel are evacuated.

Figure 2A:
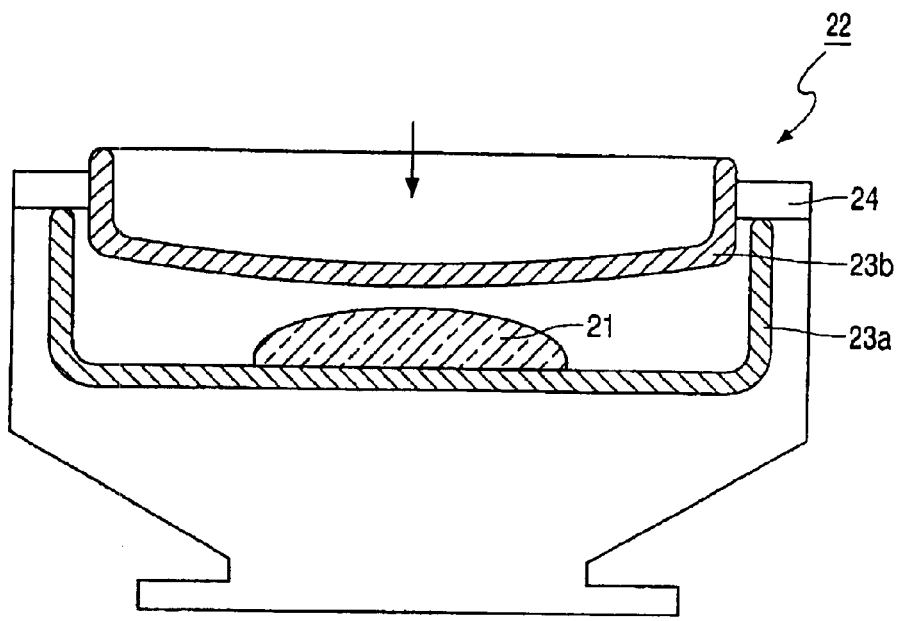
FIG. 2 illustrates the method of press-forming.
Figure 2B:
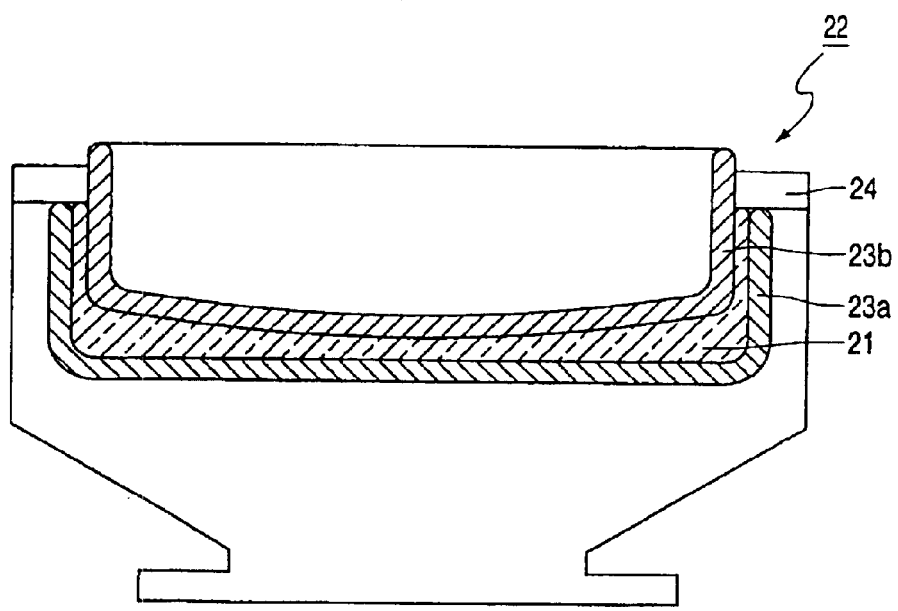
Figure 2C:
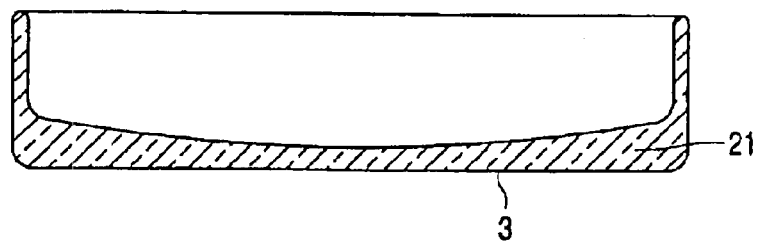

FIGS. 2A and 2B illustrate the method of press-forming. In a first method step (FIG. 2A) a glass volume 21 at a high temperature (typically 1100° C.–1000° C.) is supplied to a press 22 having a lower mould member 23a whose form corresponds to the form of the glass panel to be made, and a ring member 24. A glass panel is press-formed in the usual manner by pressing a plunger 23b in the mould member 23a, with the glass volume 21 in between (FIG. 2A). The warm glass which is in contact with the relatively cold press will cause the temperature and in particular the surface temperature of the glass to drop. After formation of the panel the plunger 23b is pulled back, the ring member 24 is removed, and the glass panel 3 is taken from the press and allowed to cool down. (FIG. 2C)

Because of the glass wedge of Real Flat (RF) panels, the center of these panel is thinner as the edge of the panel. The thinner part will normally cool down faster because of the lower heat capacity. Local temperature differences over the surface of the panel during cooling down will lead to so-called "membrane" stresses. To eliminate these stresses it is best to have an equal temperature over the surface. (Note: in the depth, because of the cooling down there is a temperature gradient, which causes the parabolic stress distribution over the thickness of the panel)

To get an equal temperature over the surface during cooling down, it is necessary to adapt the cooling to the local thickness of the glass. Cooling with heat flux Q is given by $$Q = Q_{rad} + Q_{conv} = 4\epsilon\ \sigma\ Tm^3(T_{glass} - T_{sur}) + h_{conv}(T_{glass} - T_{sur})$$

the convective part=$Q_{conv} = h_{conv}(T_{glass} - T_{sur}) = v^x(T_{glass} - T_{sur})$ the radiation part=$Q_{rad} = h_{rad}(T_{glass} - T_{sur}) = 4\epsilon\ \sigma\ Tm^3(T_{glass} - T_{sur})$ v=velocity of cooling air
$\epsilon$=emission coefficient of surroundings
$T_{sur}$=temperature of surroundings So local cooling can be adapted by:

local variation in emission coefficient $\epsilon$ local variation in velocity of cooling air v local variation in temperature of surroundings $T_{sur}$ (local heating of surroundings)

At 500–600° C., $h_{rad}(\epsilon=1) = 4*1*56.7E-9*(550+273)^3 = 100$ [W/m$^2$K], so the radiative heat transfer is comparable to a strong convective heat transfer. The radiative heat transfer can easily be changed by changing the emission coefficient, where changing the convective heat transport requires more effort. Therefore the inventions alters the local cooling of a panel by using a radiation controlling means which comprises:

a centrally located plate for reflection, $\epsilon_r$=low, optionally in combination with a plate for absorption, $\epsilon_a$=high. The central portion of the panel 3 "sees" the reflection plate, the edges of the panel "see" the absorption plate. See FIG. 3.

A suitable reflection plate should be able to reflect radiation in the infrared region. E.g. nickel plates, aluminum plates and (polished) Al-oxide plates have been found to be suitable.

Figure 3:
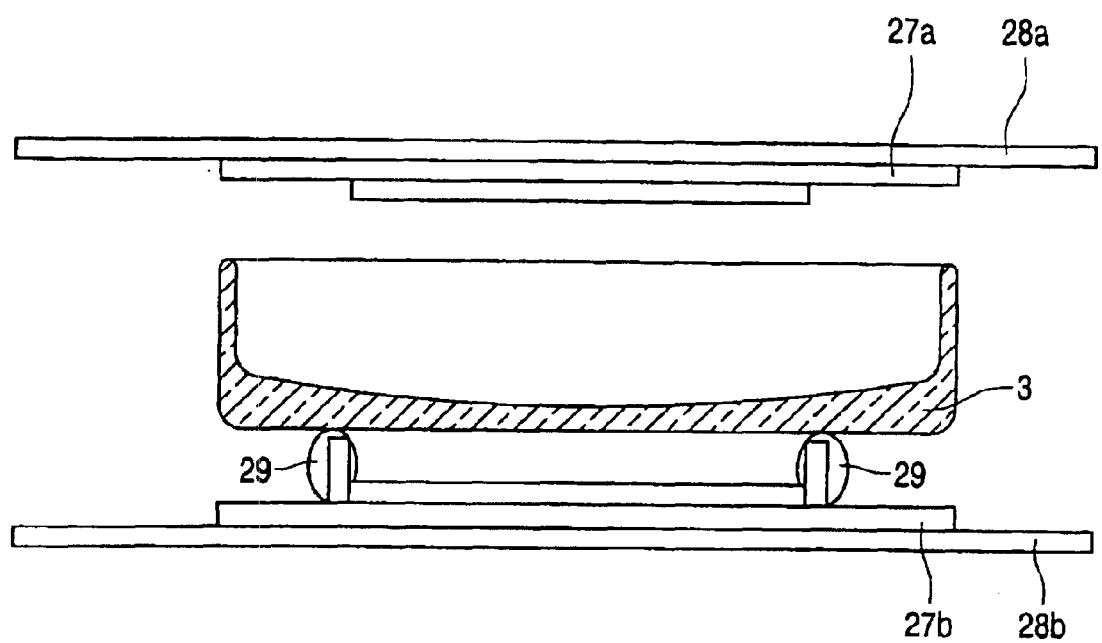
FIG. 3 illustrates the arrangement of the glass panel during a cooling step in accordance with the invention.

In the set-up given in FIG. 3 the panel is placed on heat isolating support means 29. The middle of the panel "sees" a reflection plate (27a, 27b), the edges of the panel "see" an absorption plate (28a, 28b), e.g. a blackened steel plate. The plates are placed opposite the outer surface and the inner surface of the panel, respectively. The dimensions of the plate 27 depend o.a. on the thickness of the edge portions and the panel distance.

After the panel is pressed, the panel is cooled very rapidly on the transport belt due to the surroundings at 50° C. By this rapid cooling very high stresses are induced. After this cooling on the transport belt the panel is put in an annealing lehr for a longer period at (for instance) 490° C. At this temperature a large part of the high stresses are relaxed. The resultant stress is the (relatively small) difference between high stresses caused by cooling in the surroundings and a large relaxation. Also because the relaxation is not linear (but exponential) with temperature, the cooling process is difficult to control.

To better control the temperature of the "surroundings", the set-up can be placed in an annealing lehr. The settings of the lehr can be:

1. at a constant temperature $T_{lehr}$ below $T_g$, so the hot panel with temperature $T_S$ above $T_g$ will cool down to $T_{lehr}$, the constant cooling velocity depends on $(T_S - T_{lehr})$.

2. at a temperature $T_{lehr}$ above $T_g$. After the panel is put in the lehr, the lehr starts cooling down to below $T_g$ with a constant cooling rate. The temperature of the panel will tend to follow the lehr temperature.

Cooling Results for 29RF Panels

Previously made panels are heated to 580° C., stay at this temperature for 10 minutes to release the stresses, and then the cooling lehr starts cooling down with a constant cooling velocity. So we use cooling method 1. The panels are cooled down in a lehr which has a constant cooling rate. The panel temperature will (more or less) follow the temperature of the lehr. We have used two different set-ups:

cooling with reflection plates (dimensions: 400×300, 29RF=600×470) opposite to the centre of the screen, see FIG. 3.

cooling with only absorption plates, as a reference. The cooling velocities of the lehr were 0.1/0.2/0.3/0.4/0.5° C./s Table 1 gives the resulting stresses.

TABLE 1

Measured stresses [MPa] in slices and in the complete screen (se, face)

| Screens 29RF | Centre | | | Long side North | | | Short side East | | | Diagonal N-E | | | North | |
|---|---|---|---|---|---|---|---|---|---|---|---|---|---|---|
| Cooling | Outer | Bulk | Inner | Outer | Bulk | Inner | Outer | Bulk | Inner | Outer | Bulk | Inner | se | face |
| Column nr. | A | B | C | D | E | F | G | H | I | J | K | L | M | N |
| PAC average Run 03-2000 Without refl. pl. | −11.1 | 3.6 | −6.2 | −8.5 | 4.0 | −7.1 | −9.0 | 3.9 | −6.6 | −10.1 | 3.6 | −2.9 | −14 | 8 |
| Rate = 0.1° C./s | −3.6 | 3.0 | −3.9 | −4.9 | 3.3 | −4.7 | −6.0 | 3.8 | −5.9 | −6.4 | 4.6 | −6.4 | −6 | 8.0 |
| 0.2 | −6.1 | 4.1 | −5.4 | −7.7 | 4.7 | −7.1 | −8.0 | 5.0 | −7.5 | −11.8 | 7.0 | −11.7 | −15 | 8.0 |
| 0.3 | −7.4 | 5.1 | −7.4 | −12.9 | 7.6 | −12.6 | −9.5 | 6.0 | −9.4 | −10.7 | 6.6 | −11.3 | −18 | 9.5 |
| 0.4 | −9.7 | 5.8 | −8.8 | −12.3 | 7.1 | −11.9 | −18.7 | 9.2 | −18.9 | −13.1 | 7.4 | −11.8 | −22 | 9.0 |

TABLE 1-continued

Measured stresses [MPa] in slices and in the complete screen (se, face)

| Screens 29RF | Centre | | | Long side North | | | Short side East | | | Diagonal N-E | | | North | |
| --- | --- | --- | --- | --- | --- | --- | --- | --- | --- | --- | --- | --- | --- | --- |
| Cooling | Outer | Bulk | Inner | Outer | Bulk | Inner | Outer | Bulk | Inner | Outer | Bulk | Inner | se | face |
| Column nr. | A | B | C | D | E | F | G | H | I | J | K | L | M | N |
| 0.5 With refl plates | −9.2 | 6.5 | −9.7 | −16.2 | 8.7 | −16.2 | −11.1 | 7.1 | −11.2 | −12.1 | 8.2 | −14.1 | −20 | 10.0 |
| Rate 0.1 °C./s | −3.7 | 2.5 | −3.0 | −5.9 | 3.5 | −5.8 | −5.2 | 3.3 | −4.7 | −5.9 | 3.6 | −5.8 | −4 | −1 |
| 0.2 | −6.2 | 4.0 | −5.0 | −7.1 | 4.7 | −6.8 | −8.4 | 5.4 | −8.5 | −7.6 | 4.9 | −7.5 | −11 | 2 |
| 0.3 | −8.6 | 4.7 | −7.1 | −11.4 | 5.3 | −10.3 | −9.0 | 5.5 | −9.1 | −9.4 | 5.2 | −9.3 | −14 | −1 |
| 0.4 | −8.7 | 5.2 | −8.2 | −12.1 | 6.9 | −11.2 | −10.4 | 6.2 | −9.9 | — | — | — | −15 | 1 |
| 0.5 | −8.7 | 5.5 | −8.2 | −9.2 | 6.2 | −9.3 | −11.5 | 6.8 | −12.3 | −11.0 | 6.1 | −12.1 | −9 | 1.5 |

As it can be seen in table 1 column N, the geometrical stress at the face is minimized using reflection sheets in front of the center of the screen, while bulk stresses are hardly influenced.

Cooling Results for 51RF Panels

51RF panels are pressed and after pressing the panels are placed in an annealing lehr. The cooling procedure is according to method 2, with and without the use of a reflection shield. The process settings are according to table 2.

The measured stresses turn out to be comparable to those shown in table 1.

So also with as-pressed panels, the geometrical stress at the face is substantially reduced, while bulk stresses stay at the same level.

The geometrical stress is reduced for previously made panels heated in a lehr (table 1) as well as for as-pressed screens; so the reduction is independent for starting conditions.

TABLE 2

Process settings for pressing 51RF

| | |
| --- | --- |
| Glass conditioning | 45 minutes at 1200° C. |
| Temperatures Plunger, Ring, Mould | 535° C., 535° C., 455° C. |
| Pressing time, pressing force | 50 s with 25 kN |
| Cooling time with ring | 10 s |
| Cooling time in mould | 40 s |

It will be clear to a person skilled in the art that within the framework of the invention many variations are possible. In short the invention relates to a method for the cooling of a CRT panel, in which a heat radiation controlling means is provided at a small distance from the panel, on either side of the panel, and parallel to the panel surface. Said means comprises a first area with a high reflectivity for heat radiation, which first area is near the center of the panel, and said means comprises a second area with a high absorption for heat radiation, which second area is near the edges of the panel. The result of this measure during the cooling of a panel is a more even temperature distribution over the surface of the panel. In particular, the temperature gradient between center and edge of the panel is reduced.

Because of the glass wedge of (Real) Flat panels, the center of the panel is thinner than the edge of the panel. The thinner part will normally cool down faster because of the lower heat capacity. Local temperature differences over the surface of the panel during cooling down will lead to so-called 'membrane' stresses. The method of the invention will minimize these stresses.

What is claimed is:

1. A method for manufacturing a glass panel that includes a viewing window and peripheral side walls for a display tube, comprising:

press-forming molten glass put in a mold;

cooling the formed glass after it has been taken out from the mold; and reducing a temperature gradient between center and edge of the panel during said cooling by reflecting heat radiation back to a central portion of the panel.

2. The method of claim 1, including disposing a heat radiation reflector opposite at least one of the inner and outer face portions of the central panel portion.

3. The method of claim 2, wherein the heat radiation reflector faces each of the inner and outer face portions of the central panel portion.

4. The method of claim 2, including disposing heat radiation absorbing material adjacent at least one of the edge portions of the glass panel.

5. The method of claim 2, including placing the panel, when it is at a temperature above a softening point temperature of the glass, in an annealing lehr that is set to a temperature below the softening point temperature of the glass.

6. The method of claim 2, including:

placing the panel in an annealing lehr that is set to a temperature above a softening point temperature of the glass; and leaving the panel in the annealing lehr to cool it below the softening point temperature of the glass.

7. The method of claim 2, wherein the heat radiation reflector comprises at least one plate made of at least one of: nickel, aluminum, silver, and aluminum-oxide.

8. The method of claim 2, wherein the heat radiation reflector comprises at least one plate that is covered with a layer of at least one of: nickel, aluminum, silver, and aluminum-oxide.

9. The method of claim 1, including disposing heat radiation absorbing material adjacent at least one of the edge portions of the glass panel.

\* \* \* \* \*